(12) United States Patent
Smith

(10) Patent No.: US 11,991,990 B2
(45) Date of Patent: May 28, 2024

(54) VENTILATION SYSTEM FOR CHICKS IN HOLDING AREAS

(71) Applicant: Smithway, Inc., Fairview, NC (US)

(72) Inventor: Rocky L. Smith, Fairview, NC (US)

(73) Assignee: Smithway, Inc., Fairview, NC (US)

( * ) Notice: Subject to any disclaimer, the term of this patent is extended or adjusted under 35 U.S.C. 154(b) by 474 days.

(21) Appl. No.: 17/246,947

(22) Filed: May 3, 2021

(65) Prior Publication Data

US 2021/0337772 A1  Nov. 4, 2021

Related U.S. Application Data

(60) Provisional application No. 63/018,934, filed on May 1, 2020.

(51) Int. Cl.
*A01K 31/20* (2006.01)
*A01K 1/00* (2006.01)

(52) U.S. Cl.
CPC ............ *A01K 31/20* (2013.01); *A01K 1/0052* (2013.01)

(58) Field of Classification Search
CPC .............................. A01K 31/20; A01K 1/0052
USPC .......................................................... 454/338
See application file for complete search history.

(56) References Cited

U.S. PATENT DOCUMENTS

| | | | | | |
|---|---|---|---|---|---|
| 2,610,567 | A | * | 9/1952 | Davis ................. | B60H 1/00014 |
| | | | | | 454/103 |
| 4,454,837 | A | * | 6/1984 | Luebke ..................... | B60P 3/04 |
| | | | | | 119/401 |
| 4,481,870 | A | * | 11/1984 | Smith .................. | A01K 45/005 |
| | | | | | 454/88 |
| 5,830,057 | A | * | 11/1998 | Hunt, Jr. ................... | B60P 3/20 |
| | | | | | 454/91 |
| 6,478,669 | B1 | * | 11/2002 | Van ........................... | B60P 3/20 |
| | | | | | 454/118 |
| 6,581,544 | B1 | * | 6/2003 | Smith ....................... | B60P 3/04 |
| | | | | | 62/412 |
| 6,963,796 | B2 | * | 11/2005 | Larson .................... | B60R 16/03 |
| | | | | | 701/69 |
| 8,794,187 | B2 | * | 8/2014 | Smith ....................... | B60P 3/04 |
| | | | | | 454/91 |
| 9,599,362 | B2 | * | 3/2017 | Leiterman ............ | A01K 1/0047 |
| 10,631,517 | B2 | * | 4/2020 | Kim ....................... | B60H 1/245 |
| 2008/0139104 | A1 | * | 6/2008 | Lemke ................. | A01K 1/0076 |
| | | | | | 454/233 |
| 2018/0228125 | A1 | * | 8/2018 | Mason ..................... | A01K 1/12 |

* cited by examiner

*Primary Examiner* — Avinash A Savani
*Assistant Examiner* — Dana K Tighe
(74) *Attorney, Agent, or Firm* — The Van Winkle Law Firm; William G. Heedy

(57) ABSTRACT

A ventilation system includes a blower having a blower output port; a blower platform connected to the blower output port, and having a blower platform output port; a plurality of series-connected ventilator platforms; and an end cap connected to the output opening of a distal ventilator platform of the plurality of series-connected ventilator platforms.

11 Claims, 4 Drawing Sheets

VENTILATION SYSTEM FOR CHICKS IN HOLDING AREAS

RELATED APPLICATION

This application claims priority to and incorporates entirely by reference United States Provisional Patent Application Ser. No. 63/018,934 filed on May 1, 2020.

FIELD OF THE INVENTION

A ventilation system for stacked poultry, such as stacked chicks, in holding areas is disclosed.

BACKGROUND OF THE INVENTION

Poultry hatcheries produce chicks of several different breeds and varieties. A concern of many hatcheries is the required amount of space in its chick holding rooms, which are the rooms in which the chicks are held in prior to shipping. Current regulations require keeping the stacks of boxed chicks separate so that there is adequate air flow around them, thereby resulting in a considerable amount of unused space.

SUMMARY

In accordance with one form of the present invention, there is provided a ventilation system having a blower, a blower platform, and a plurality of series-connected ventilator platforms. The blower has a blower output port, the blower platform is connected to the blower output, and the blower platform has a blower platform output port. A ventilator platform has an input opening, an output opening, and a plurality of ventilator holes. An input opening is connected to either the blower platform output port or to the output port of a previous ventilator platform. An end door may be connected to the output opening of the distal ventilator platform. A ventilator platform has a top and two sides, all preferably with ventilator holes. The top and the end door may be hinged or removable to allow for convenient cleaning.

BRIEF DESCRIPTION OF THE DRAWING

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION

Referring to the several views of the drawings, the ventilation system of the present invention is shown and described herein and is generally indicated as 10.

Figure 1:
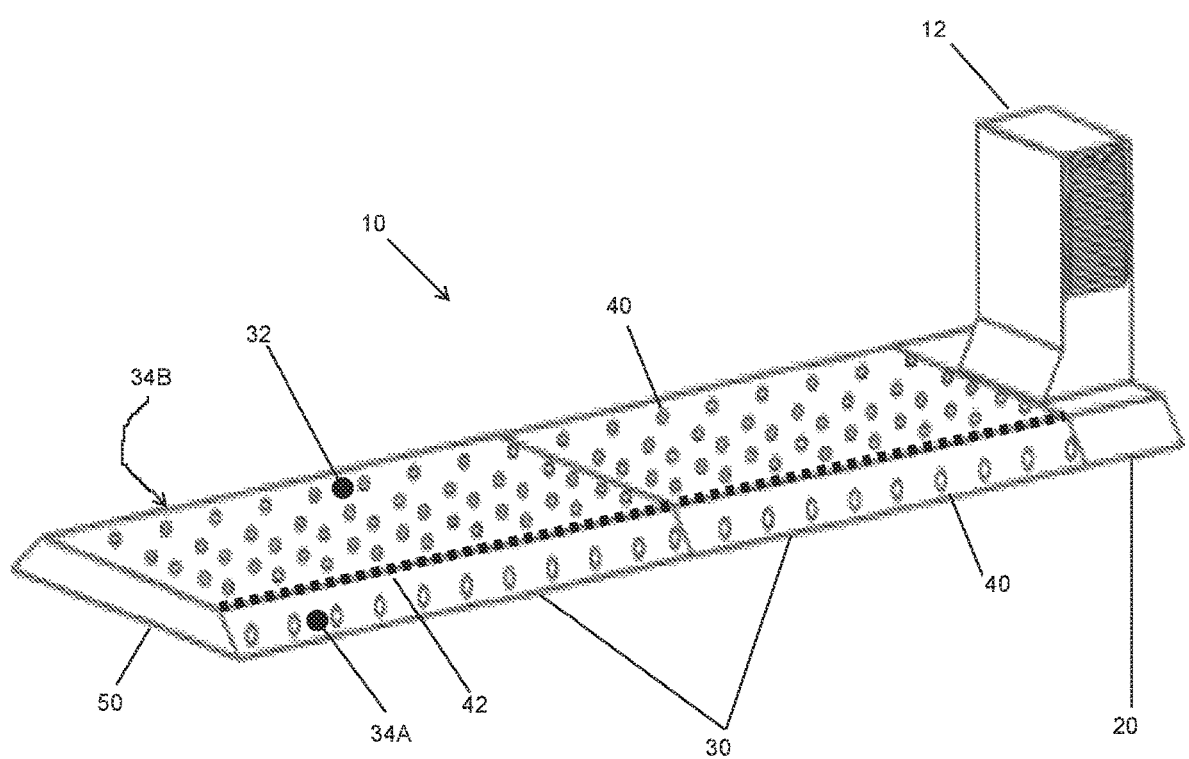
FIG. 1 is an illustration of an embodiment of a ventilation system.

FIG. 1 is an illustration of an embodiment of a ventilation system 10 having a blower 12, a blower platform 20, a plurality of series-connected ventilator platforms 30, and an end door or cap 50. The blower 12 draws in ambient air and forces the air into the blower platform 20. The blower platform 20 is connected to a first ventilator platform 30 of a plurality of series-connected ventilator platforms 30, each of which has a plurality of ventilator holes 40 on the top 32 and sides 34A, 34B. The ventilator holes 40 on the sides 34A, 34B provide for better air flow than if the ventilator holes 40 were only on the top 32.

A ventilation system 10 may have only a single ventilator platform 30 but preferably has two or more ventilator platforms 30. The ventilator platform 30 distal from the blower 12 preferably has an end door or cap 50. The blower 12 forces ambient air through the blower platform 20, into the series-connected ventilator platforms 30, and out through the ventilator holes 40. This forces air through stacked boxes of chicks (see FIGS. 2 and 3) to maintain the chicks at a desired temperature.

The ventilator platform top 32 is preferably connected to a ventilator platform side 34A or 34B by a hinge 42, so that the top 32 can be opened to allow for convenient cleaning of the ventilator platforms 30. Another technique may be used, if desired, to provide for opening or removal of the top 32. The end door or cap 50 may be hinged, or otherwise openable or removable, so that, during cleaning, the waste material is washed out the through the distal platform 30.

Figure 2:
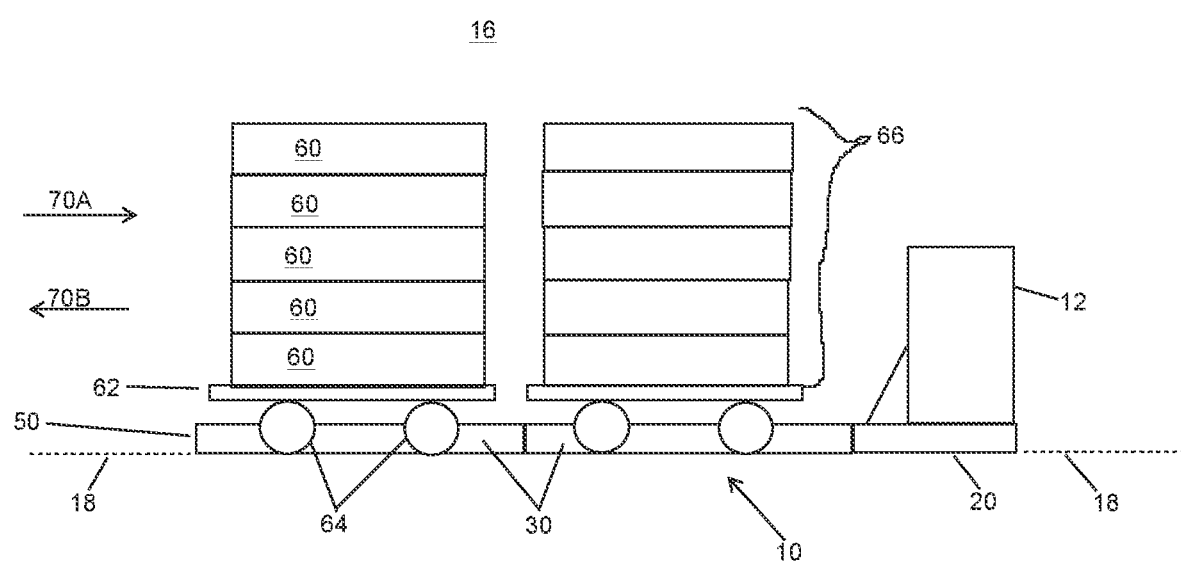
FIG. 2 is a side view illustration of the ventilation system in an environment.
Figure 3:
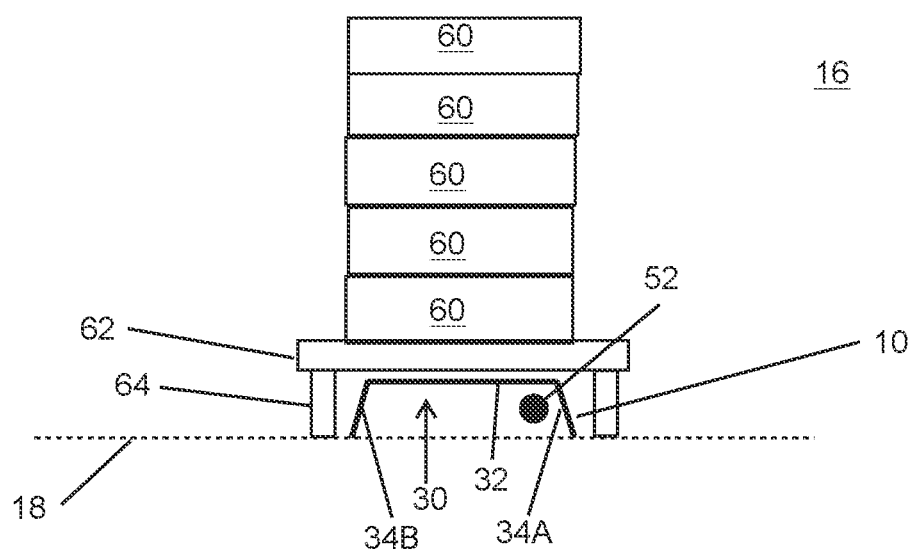
FIG. 3 is an end view illustration of the ventilation system in the environment.

FIG. 2 is a side view illustration of the ventilation system 10 in an environment, such as a holding room 16, and FIG. 3 is an end illustration of the ventilation system 10 in the environment. For convenience of illustration, the ventilation holes 40 are not shown in these figures. A stack 66 of poultry boxes 60 rides on a pallet base 62, which has pallet wheels 64. The pallet base 62 and wheels 64 straddle the ventilator platform 30 (see FIG. 3) so that a stack 66 may be easily pushed over 70A, or pulled from 70B, the ventilator platform 30. Therefore, a forklift is not necessary to move the stacks 66 onto and off on the ventilator platform 30. This arrangement is preferable because many holding rooms do not have adequate size to accommodate a forklift.

The system 10 is particularly well-suited for use in the holding room 16 in a hatchery where chicks are held after being removed from the chick pallet holding floor. A holding room is a ventilated, temperature-controlled room, with the temperature being selected to prevent overheating or chilling of the chicks. Once the chicks are placed in the boxes 60, the boxes are stacked on a pallet base 62 to form a stack 66. The stack 66 is then rolled into the holding room 16 and over the ventilator platforms 30. Several stacks may be rolled over each ventilator platform 30, and there may be multiple stacks 66 and multiple systems 10 in a holding room 16. Later, a stack 66 may be rolled away from over a ventilator platform 30 and toward a loading dock, where a forklift may then move the stack 66 for transport to a different location.

The ventilator platform 30, in conjunction with the floor 18 of the holding room 16, form a channel 52 (see FIG. 3) by which air travels from the blower 12 to the ventilation holes 40. The air is thereby forced from the ventilation holes 40 up and through the stack 66, thereby maintaining the chicks at a desired temperature. Two stacks 66 are shown for convenience of illustration, but there may only be a single stack 66, or there may be three or more stacks 66, as desired.

In an implementation, the top 32 and sides 34 of a ventilator platform 30 are preferably, but not necessarily, ⅛ inch aluminum plate on a frame made of 1 inch×1 inch×⅛ inch aluminum square tubing.

In an alternative implementation, the pallet base 62 is not used and the bottom box 60 has the wheels 64.

Figure 4:
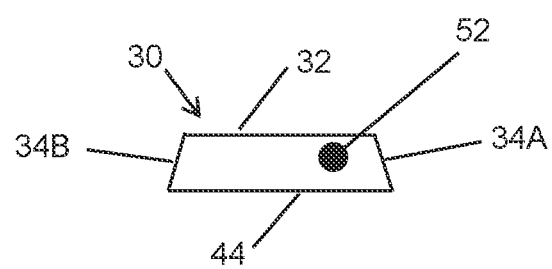
FIG. 4 illustrates an alternative implementation of a ventilator platform of the ventilation system.

FIG. 4 illustrates an alternative implementation in which the ventilator platform 30 also has a bottom 44 which forms the channel 52, instead of or in addition to the floor 18.

Figure 5:
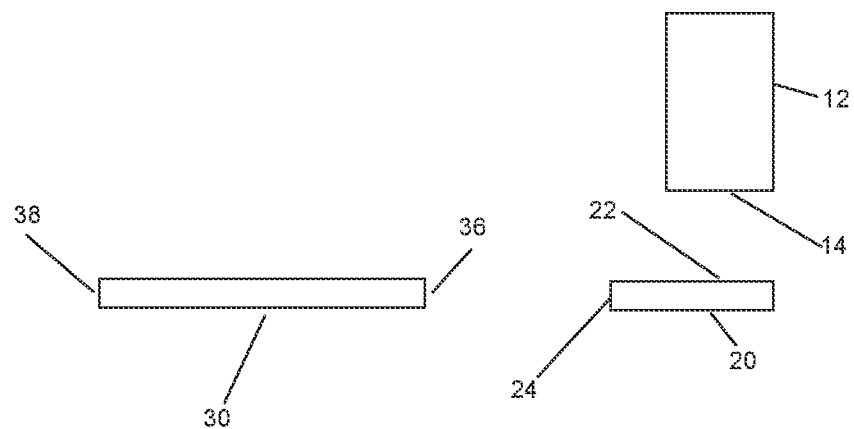
FIG. 5 is an exploded partial view of the ventilation system.

FIG. 5 is an exploded partial view of the ventilation system 10 indicating the blower output port 14, the blower platform input port 22, the blower platform output port 24, the ventilator platform input port 36, and the ventilator platform output port 38. The blower output port 14 is connected by any convenient means to the blower platform input port 22, such as by screws or rivets. The blower platform output port 24 is held against (connected to) the ventilator platform input port 36 by any convenient means, such as by screws, flanges, or by the weight of the blower platform 20 and the ventilator platform 30. The use of flanges or the weight allows for quick assembly and disassembly but the connection should be checked and adjusted to avoid air leaks. The output port 38 of one ventilator platform 30 is held against (connected to) the input port 36 of a next ventilator platform 30, also by any convenient means, such as by screws, flanges, or weight.

In an exemplary environment a chick box 60 is 50.5 inches by 50.5 inches by 6 inches high and, when the boxes 60 are stacked, a box 60 partially nests inside the box 60 beneath it, so that the internal height (floor of a box to the floor of the box above it) is 4.5 inches. An exemplary implementation in this exemplary environment might be: the length of a ventilator platform 30 is 8 feet, the width of the ventilator platform top 32 is 60 inches, the height of the ventilator platform 30 is 6 inches, and the base, or the optional bottom 44, of the ventilator platform 30 is 68 inches. Different dimensions may be used, as desired or necessary, for example, for differently-sized boxes 60. In an exemplary implementation, the diameter of a ventilator platform hole 40 is 1.125 inches, and the holes 40 are spaced 6 inches center-to-center. The length of a ventilator platform 30 may be selected to accommodate one, two, three, or more stacks 66, with due consideration being given to the weight of a platform 30 and the desirability of being able to move the platform 30, and two or more ventilator platforms 30 may be connected in series to accommodate more stacks 66.

In an implementation, the blower speed of the blower 12 is adjustable so as to maintain a nominal output air flow of 1200 cubic feet per minute (CFM), which will vary depending upon the total length of the series connected ventilator platforms 30. Also, the temperature of the poultry may be monitored, such as by measuring the temperature in a stack 66 or at the top of a stack 66, and the blower speed can be increased to maintain the monitored temperature(s) within desired limits and prevent the poultry from overheating. Preferably, the blower speed will run at the minimum level necessary to prevent the poultry from overheating so as to conserve energy and to prevent excessive air flow from disturbing the poultry.

Typically, 100 chicks are loaded into a box 60, and then the boxes 60 are stacked to form a stack 66, which is then placed on a pallet base 62. Each box 60 is open on all four sides, top, and bottom. "Open" means that the side, top, or bottom has a construction which has holes of sufficient size and spacing to allow for air flow to cool the poultry, but not so large as to allow the poultry to escape; for example, wire mesh supported by a frame.

In a preferred implementation, on a full pallet, there are 8 stacks of chick boxes, each stack is 15 boxes high, and there are 100 chicks per box, so up to 12,000 chicks are loaded into a pallet base 62.

In an implementation, the blower 12 is powered by 230 volt, 3-phase line power. Other voltages and/or phasing may be used, or battery power may be used, as desired or convenient in a particular environment.

The dimensions specified herein are preferred, but not mandatory, and different dimensions may be used, as desired or necessary for a particular environment.

Thus, a ventilation system has been described which comprises a blower having a blower output port; a blower platform connected to the blower output port, and having a blower platform output port; a plurality of series-connected ventilator platforms; and an end cap connected to the output opening of a distal ventilator platform of the plurality of series-connected ventilator platforms. A ventilator platform has an input opening, an output opening, and a plurality of ventilator holes, and the input opening is connected to either the blower platform output port or to the output opening of a previous ventilator platform. A ventilator platform has a top and two sides, the ventilator holes being in the top and the two sides. The two sides may be sloped with respect to the top. The top may be hinged to one of the sides. An input or output opening may have a frame around it. The end cover or cap may be hinged, or removable and replaceable. An opening may be in the shape of a trapezoid, the trapezoid having a top, two sides, and a base, with the base being formed by the floor of the holding room.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the claims herein. While different embodiments have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without following, or departing from the spirit and scope of, the exemplary embodiments and applications illustrated and described herein. Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims that may be written therefor.

What is claimed is:

1. A ventilation system comprising:
   a blower having a blower output port;
   a blower platform connected to the blower output port, and having a blower platform output port;
   a plurality of series-connected ventilator platforms;
   an end cap connected to an output opening of a distal ventilator platform of the plurality of series-connected ventilator platforms; and
   wherein the blower has an adjustable blower speed so as to maintain a nominal output air flow of 1200 cubic feet per minute.

2. The ventilation system as recited in claim 1 wherein each one of the plurality of ventilator platforms has an input opening, an output opening, and a plurality of ventilator holes, and wherein the input opening being connected to either the blower platform output port or to the output opening of a previous ventilator platform.

3. The ventilation system as recited in claim 2 wherein each one of the plurality of ventilator platforms has a top and two sides, the plurality of ventilator holes being in the top and the two sides.

4. The ventilation system as recited in claim 3 wherein the two sides are sloped with respect to the top.

5. The ventilation system as recited in claim 4 wherein the top is hinged to one of the two sides.

6. The ventilation system as recited in claim 1 wherein the blower is powered by 230 volt, 3-phase line power.

7. A ventilation system comprising:
- a blower having a blower output port;
- a blower platform connected to the blower output port, and having a blower platform output port;
- a plurality of series-connected ventilator platforms;
- an end cap connected to an output opening of a distal ventilator platform of the plurality of series-connected ventilator platforms;
- wherein each one of the plurality of ventilator platforms has an input opening, an output opening, and a plurality of ventilator holes, and wherein the input opening being connected to either the blower platform output port or to the output opening of a previous ventilator platform;
- wherein each one of the plurality of ventilator platforms has a top and two sides, the plurality of ventilator holes being in the top and the two sides;
- wherein the two sides are sloped with respect to the top; and
- wherein the top is hinged to one of the two sides.

8. The ventilation system as recited in claim 7 wherein the blower is powered by 230 volt, 3-phase line power.

9. The ventilation system as recited in claim 7 wherein the blower has an adjustable blower speed so as to maintain a nominal output air flow of 1200 cubic feet per minute.

10. A ventilation system comprising:
- a blower having a blower output port;
- a blower platform connected to the blower output port, and having a blower platform output port;
- a plurality of series-connected ventilator platforms;
- an end cap connected to an output opening of a distal ventilator platform of the plurality of series-connected ventilator platforms;
- wherein the blower has an adjustable blower speed so as to maintain a nominal output air flow;
- wherein each one of the plurality of ventilator platforms has an input opening, an output opening, and a plurality of ventilator holes, and wherein the input opening being connected to either the blower platform output port or to the output opening of a previous ventilator platform;
- wherein each one of the plurality of ventilator platforms has a top and two sides, the plurality of ventilator holes being in the top and the two sides;
- wherein the two sides are sloped with respect to the top; and
- wherein the top is hinged to one of the two sides.

11. The ventilation system as recited in claim 10 wherein the blower is powered by 230 volt, 3-phase line power.

* * * * *